(12) United States Patent
Sato

(10) Patent No.: US 7,823,958 B2
(45) Date of Patent: Nov. 2, 2010

(54) VEHICLE DECK STRUCTURE

(75) Inventor: Kenji Sato, Ichinomiya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 174 days.

(21) Appl. No.: 12/149,715

(22) Filed: May 7, 2008

(65) Prior Publication Data

US 2008/0277971 A1 Nov. 13, 2008

(30) Foreign Application Priority Data

May 11, 2007 (JP) ................ 2007-127208

(51) Int. Cl.
B62D 33/02 (2006.01)

(52) U.S. Cl. ............ 296/183.1; 296/184.1; 296/193.07; 296/30

(58) Field of Classification Search .............. 296/183.1, 296/183.2, 184.1, 187.08, 193.07, 30
See application file for complete search history.

(56) References Cited

U.S. PATENT DOCUMENTS

| | | | | |
|---|---|---|---|---|
| 5,660,427 A * | 8/1997 | Freeman et al. | ........ | 296/190.08 |
| 6,170,905 B1 | 1/2001 | Jurica | | |
| 6,283,538 B1 * | 9/2001 | Reitnouer | ................ | 296/184.1 |
| 6,705,668 B1 * | 3/2004 | Makita et al. | ......... | 296/187.03 |
| 6,733,067 B1 * | 5/2004 | Miskech et al. | ......... | 296/183.1 |
| 6,811,211 B2 * | 11/2004 | Saito | ...................... | 296/203.02 |
| 6,814,397 B2 * | 11/2004 | Henderson et al. | ....... | 296/184.1 |
| 7,118,168 B2 * | 10/2006 | Vincenti | ................ | 296/203.04 |
| 7,284,787 B2 * | 10/2007 | McNulty et al. | ......... | 296/183.1 |
| 7,290,827 B2 * | 11/2007 | McNulty et al. | ......... | 296/183.1 |
| 7,322,640 B2 * | 1/2008 | Ni et al. | ...................... | 296/204 |
| 7,407,223 B2 * | 8/2008 | Ito et al. | ................ | 296/193.07 |
| 7,416,242 B2 * | 8/2008 | Godfrey et al. | ........ | 296/187.08 |
| 7,490,892 B2 * | 2/2009 | Sato | ........................ | 296/184.1 |
| 7,527,326 B2 * | 5/2009 | Egawa et al. | ........... | 296/193.07 |
| 2008/0150322 A1 * | 6/2008 | Shelbo et al. | ............ | 296/184.1 |
| 2009/0102238 A1 * | 4/2009 | Gomi | .................... | 296/193.07 |

FOREIGN PATENT DOCUMENTS

| | | |
|---|---|---|
| JP | 61-17380 | 1/1986 |
| JP | 63-185784 | 11/1988 |
| JP | 6-25085 | 4/1994 |
| JP | U 07-011488 | 2/1995 |
| JP | 2000-512239 | 9/2000 |

OTHER PUBLICATIONS

Japanese Office Action dated Mar. 31, 2009.

* cited by examiner

*Primary Examiner*—Jason S Morrow
(74) *Attorney, Agent, or Firm*—Finnegan, Henderson, Farabow, Garrett & Dunner, LLP

(57) ABSTRACT

A vehicle deck structure that can suppress deformation of a deck floor is provided. The vehicle deck structure includes a deck floor that extends in a vehicle body front-rear direction and a vehicle width direction, a cross member disposed at a lower side of the deck floor and whose longitudinal direction corresponds to the vehicle width direction, and a top plate as a reinforcing member interposed between the deck floor and the cross member. The top plate has a plurality of ridges, whose longitudinal directions each correspond to the vehicle body front-rear direction, and which are arranged in parallel in a vehicle width direction, and these ridges overhang at both sides in the vehicle front-rear direction with respect to the cross member.

7 Claims, 13 Drawing Sheets

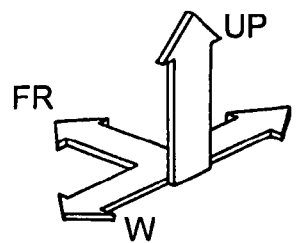
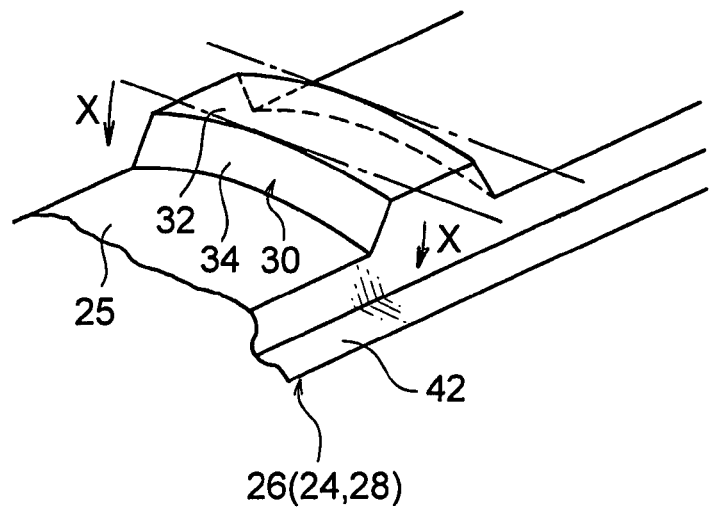
FIG. 4A
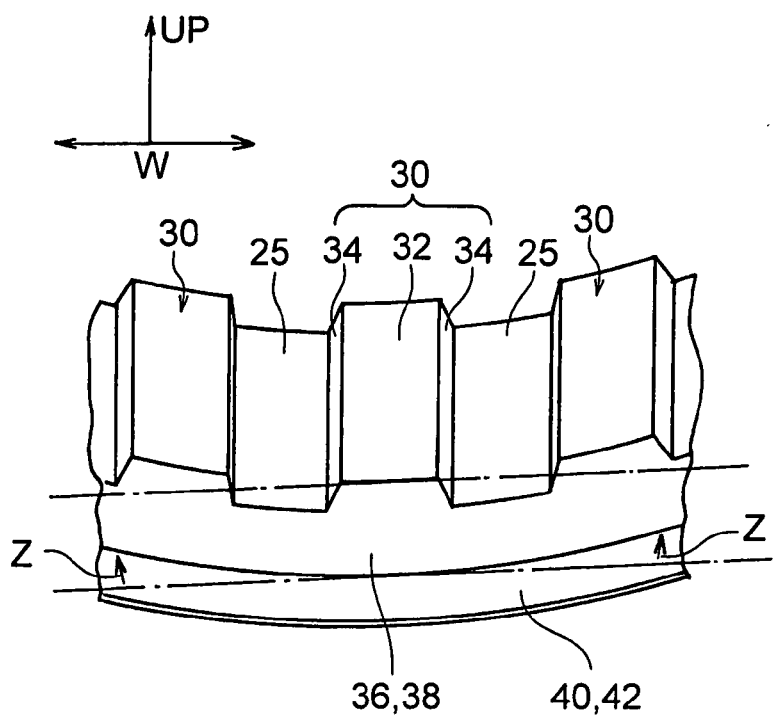
FIG. 4B

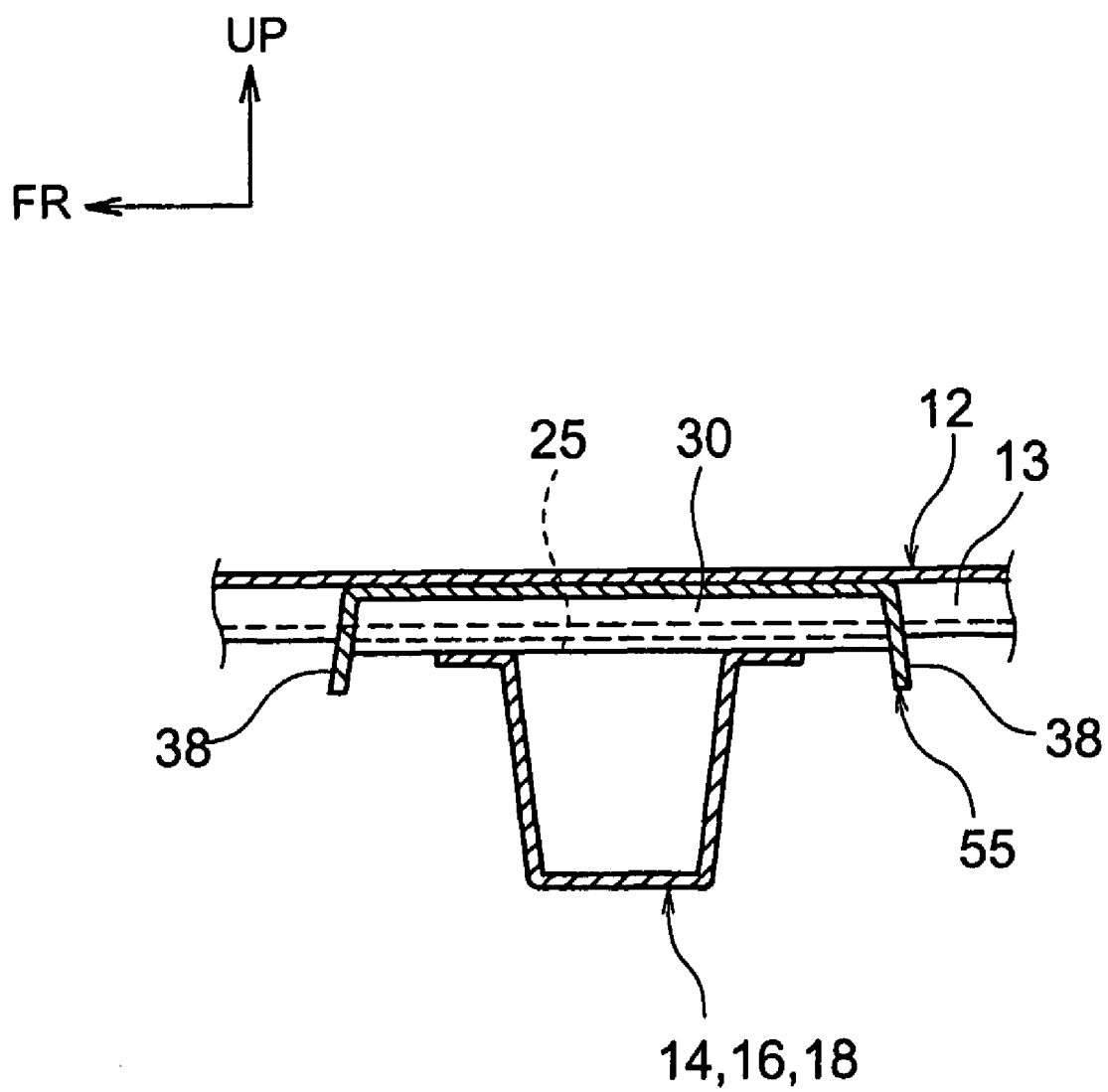

VEHICLE DECK STRUCTURE

CROSS-REFERENCE TO RELATED APPLICATION

This application claims priority under 35 USC 199 from Japanese Patent Application No. 2007-127208, the disclosure of which is incorporated by reference herein.

BACKGROUND OF THE INVENTION

1. Technical Field

The present invention relates to a vehicle deck structure that is applied, for example, to a loading bed of a small-size truck or the like.

2. Related Art

In a small-size truck, as described, for example, in Japanese Utility Model Application Laid-Open (JP-U) No. 6-25085, a chassis frame is configured by a pair of right and left side members extending in a vehicle body front-rear direction and a cross member connecting the pair of right and left side members, and a rear deck is provided on this chassis frame. The rear deck is mounted to the chassis frame via cross members fixed at a lower side of the deck floor at a plurality of places spaced apart in the vehicle body front-rear direction.

SUMMARY

However, in the conventional art such as described above, although a ridge is provided at the deck floor, rigidity of the deck floor needs to be enhanced in a case where, for example, the load of a loaded material or the input from a road surface is great.

In consideration of the circumstances described above, the present invention provides a vehicle deck structure that can suppress deformation of a deck floor.

A vehicle deck structure according to a first aspect of the present invention comprises a deck floor extending in a vehicle body front-rear direction and a vehicle width direction; a cross member, whose longitudinal direction corresponds to the vehicle width direction, and which is disposed at a lower side in a vehicle body up-down direction with respect to the deck floor; and a reinforcing member having a plurality of ridges, whose longitudinal directions correspond to the vehicle body front-rear direction, and which are arranged in parallel in a vehicle width direction, the reinforcing member being interposed between the cross member and the deck floor with a posture in which the ridges overhang at least one side in the vehicle body front-rear direction with respect to the cross member.

BRIEF DESCRIPTION OF THE DRAWINGS

Embodiments of the present invention will be described in detail based on the following figures, wherein:

FIGS. 3A to 3C are views showing the vehicle deck structure according to the embodiment of the present invention, in which FIG. 3A is a cross-sectional view along a line 3A-3A in FIG. 2, FIG. 3B is a cross-sectional view along a line 3B-3B in FIG. 2, and FIG. 3C is a cross-sectional view along a line 3C-3C in FIG. 2;

FIGS. 4A and 4B are views for explaining a reinforcing effect due to the vehicle deck structure according to the embodiment of the present invention, in which FIG. 4A is a perspective view showing bending in a front-rear direction of a top plate, and FIG. 4B is a perspective view showing bending in a vehicle width direction of the top plate;

FIGS. 6A and 6B are views of the vehicle deck structure according to the embodiment of the present invention, showing a case where a load from a frame is received, in which FIG. 6A is a sectional side view before deformation, and FIG. 6B is a sectional side view exaggeratedly showing a deformation state;

FIGS. 9A and 9B are views showing a first modified example of the top plate constituting the vehicle deck structure according to the embodiment of the present invention, in which FIG. 9A is a sectional side view at a region where a ridge is disposed, and FIG. 9B is a sectional side view between ridges;

FIG. 10 is a sectional side view showing a second modified example of the top plate constituting the vehicle deck structure according to the embodiment of the present invention;

FIGS. 13A and 13B are views showing a fifth modified example of the top plate constituting the vehicle deck structure according to the embodiment of the present invention, in which FIG. 13A is a sectional side view at a region where a ridge is disposed, and FIG. 13B is a sectional side view between ridges.

DETAILED DESCRIPTION OF THE INVENTION

Figure 1:
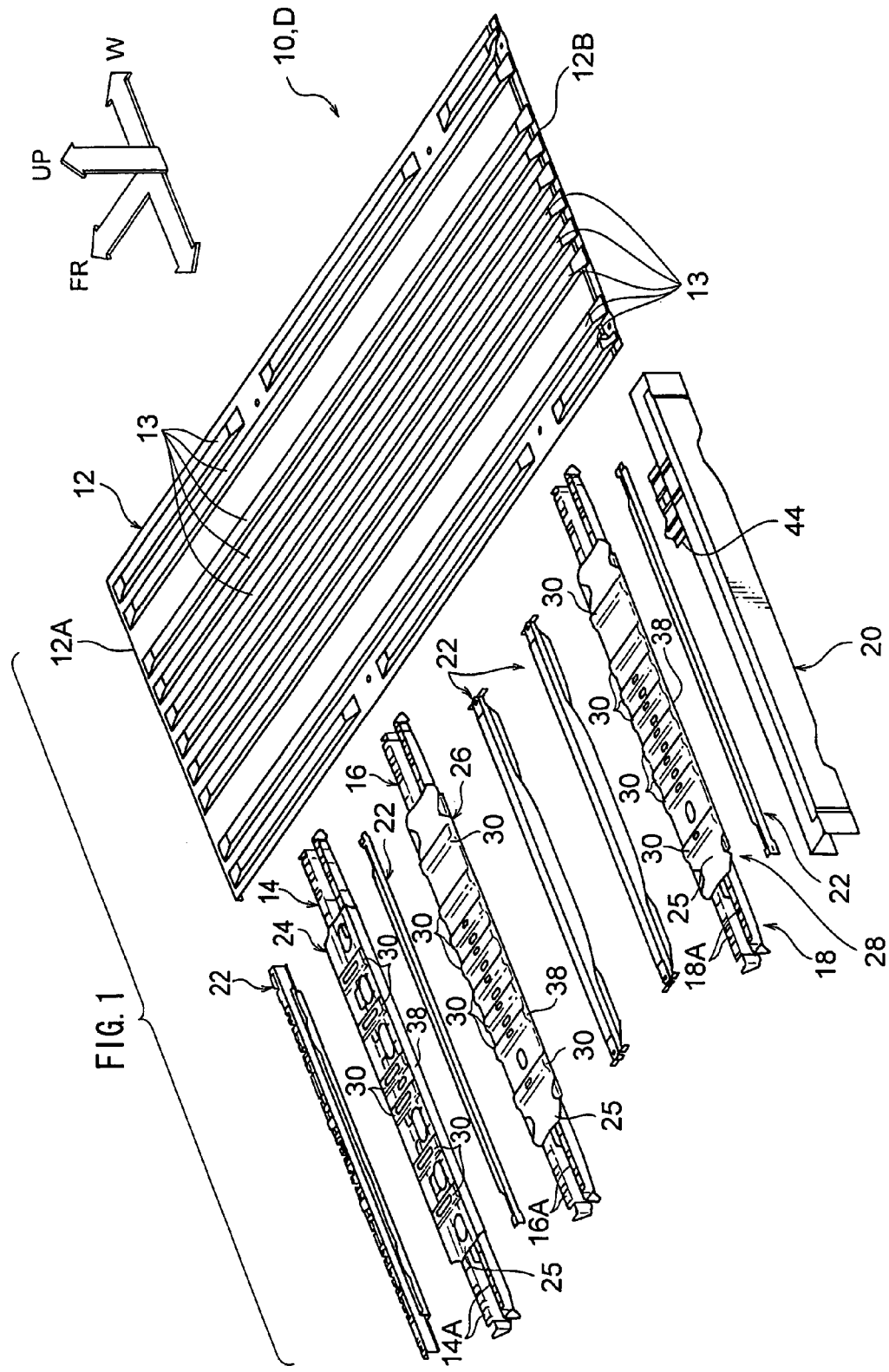
FIG. 1 is an exploded perspective view of a vehicle deck structure according to an embodiment of the present invention.

Herebelow, an example of an exemplary embodiment of the present invention will be described in detail with reference to the drawings.

A vehicle deck structure 10 according to an exemplary embodiment of the present invention will be explained based on FIGS. 1 to 8. It should be noted that, arrow FR, arrow UP and arrow W, which are appropriately shown in the drawings, indicate a front direction in a vehicle body front-rear (traveling) direction of a motor vehicle T serving as a vehicle to which the vehicle deck structure 10 is applied, an up direction in a vehicle body up-down direction, and a vehicle width direction, respectively.

Figure 8:
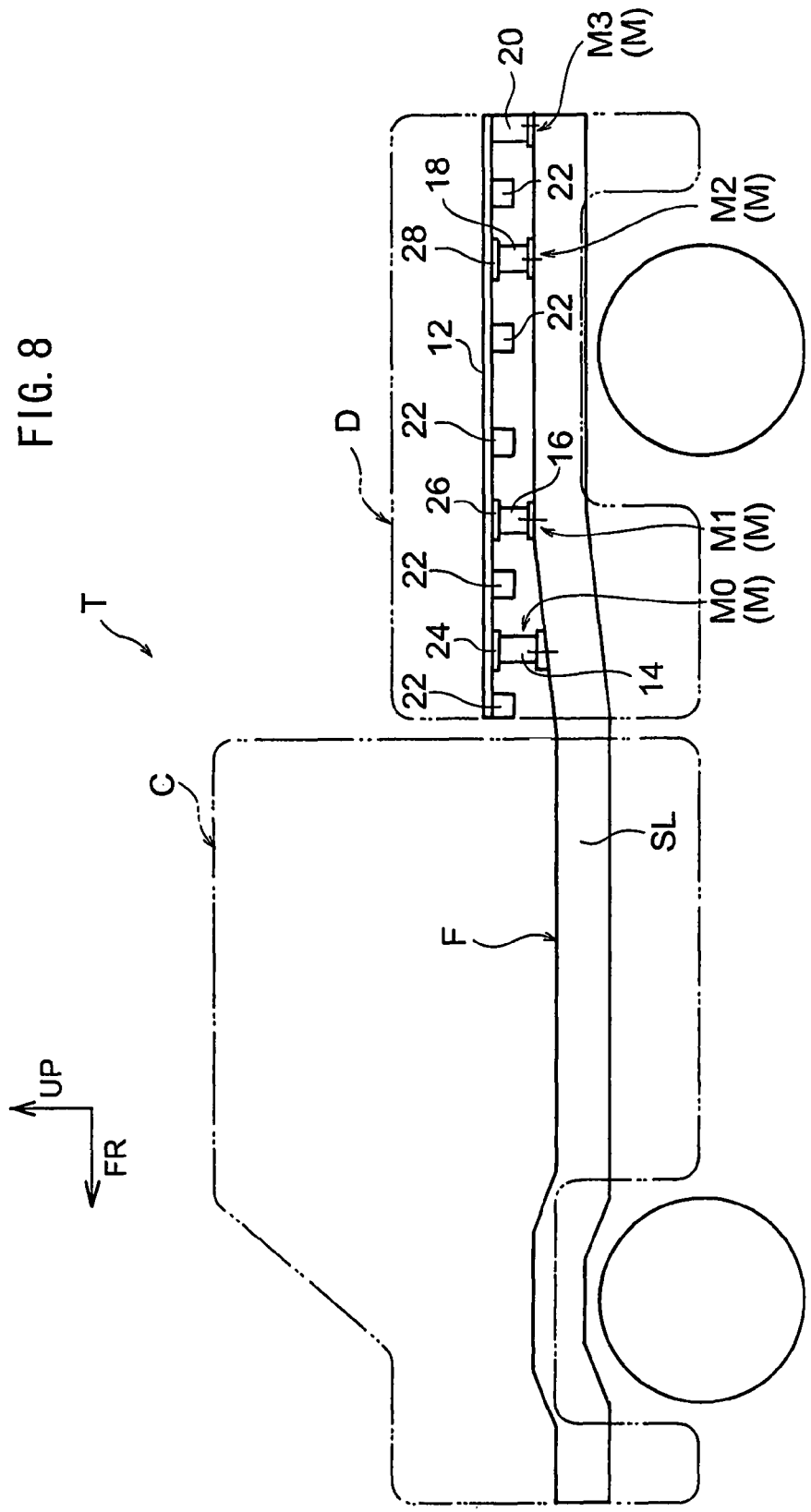
FIG. 8 is a side view showing a schematic configuration of a motor vehicle to which the vehicle deck structure according to the embodiment of the present invention has been applied.

In FIG. 8, a schematic configuration of the motor vehicle T to which the vehicle deck structure 10 is applied is shown in a side view. As shown in this drawing, the motor vehicle T is a small-size truck having a structure with a frame and is provided with a chassis frame F extending in a vehicle body front-rear direction. The chassis frame F comprises a pair of right and left side rails SL, whose longitudinal directions each correspond to the vehicle body front-rear direction, and a plurality of unillustrated cross members bridging between the pair of right and left side rails SL, and forms a substantial ladder shape in plan view.

At a front portion of the chassis frame F, a cab C serving as a driver's platform is supported via an unillustrated cab mount, and at a rear portion of the chassis frame F, a deck D serving as a loading bed is supported via a plurality of deck mounts M. More specifically, the deck D is supported via a plurality of (four at each of the right and left in the present exemplary embodiment) deck mounts M0 to M3 spaced apart in the vehicle body front-rear direction, with respect to the pair of right and left side rails SL of the chassis frame F. Further, the vehicle deck structure 10 according to the exemplary embodiment of the present invention is applied to the deck D. This is explained specifically below.

In FIG. 1, an exploded perspective view of the deck D to which the vehicle deck structure 10 is applied is shown. As shown in the drawing, the deck D is provided with a deck floor 12 extending in the vehicle body front-rear direction and the vehicle width direction. In the deck floor 12, a plurality of ridges 13, whose longitudinal directions correspond to the vehicle body front-rear direction, are formed so as to be arranged in parallel in the vehicle width direction by press working or the like of a panel material (plate material).

Further, the deck D is provided with a plurality of cross members 14, 16, 18 and 20 that are fixed at a lower surface side, in a vehicle body up-down direction, of the deck floor 12. The respective cross members 14, 16, 18 and 20 each have a longitudinal direction corresponding to the vehicle width direction and are disposed so as to be spaced apart from each other in the vehicle body front-rear direction. The cross member 14 positioned furthest to the front side is disposed slightly behind a front end 12A of the deck floor 12, and the cross member 20 positioned furthest to the rear side is positioned along a rear end 12B of the deck floor 12.

Further, as shown in FIG. 1, a plurality of cross members 22 that are not supported by the chassis frame F are fixed at the lower surface of the deck floor 12. The plurality of cross members 22 each have a longitudinal direction corresponding to the vehicle width direction and are disposed so as to be spaced apart in the vehicle body front-rear direction from each of the cross members 14, 16, 18 and 20.

Furthermore, lengths of the respective cross members 14, 16, 18 and 20 along the vehicle width direction are made to be greater than a width of the deck floor 12 along the vehicle width direction. Moreover, the lengths of the respective cross members 14, 16, 18 and 20 along the vehicle width direction are made to be greater than lengths of the plurality of cross members 22 along the vehicle width direction. As shown in FIG. 8, the deck mounts M0, M1, M2 and M3 support the deck D at the cross members 14, 16, 18 and 20 in the deck D. It should be noted that the pairs of right and left deck mounts M0, M1, M2 and M3 are each disposed within the range of the width of the deck floor 12 in the vehicle width direction.

Further, as shown in FIG. 1, in the vehicle deck structure 10, top plates 24, 26 and 28 serving as reinforcing members are respectively interposed between the cross members 14, 16 and 18 and the deck floor 12. The cross members 14, 16 and 18 are each configured with a hat shape that opens upward in the vehicle body up-down direction, the top plates 24, 26 and 28 are joined to upper flanges 14A, 16A and 18A of the cross members 14, 16 and 18, and a closed cross-section (framework) structure having a longitudinal direction corresponding to the vehicle width direction is formed by the cross members 14, 16 and 18 and the top plates 24, 26 and 28.

As shown in FIG. 1, the top plates 26 and 28, which are interposed between the cross member 16 and cross member 18 and the deck floor 12, have substantially the same configuration, and the top plate 24, which is interposed between the cross member 14 and the deck floor 12, has a slightly different structure with respect to the top plates 26 and 28. Below, the top plate 26 (top plate 28) will be explained first, and then explanation of portions of the top plate 24 that are different from the top plate 26 will be given.

Figure 2:
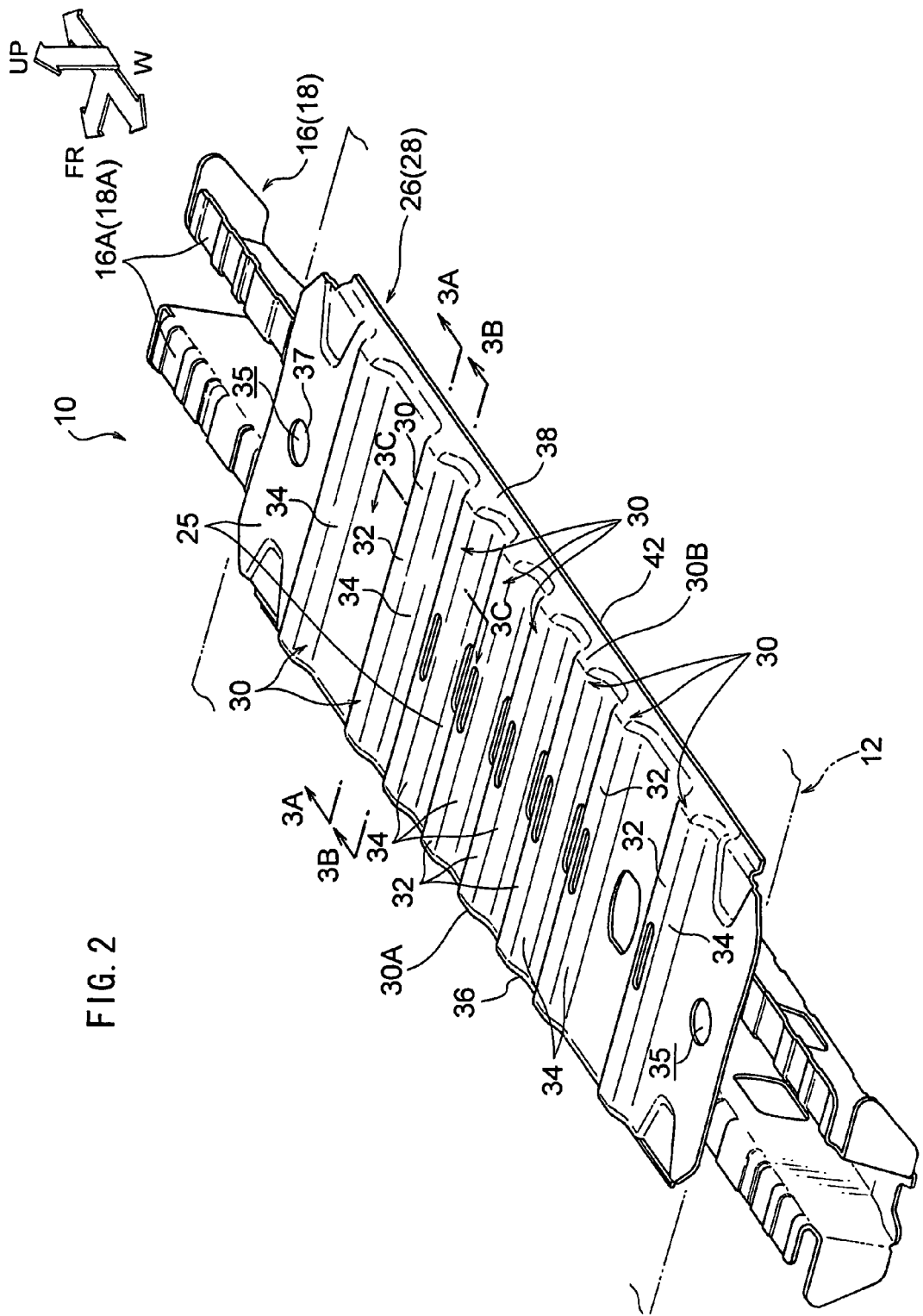
FIG. 2 is a perspective view in which a main portion of the vehicle deck structure according to the embodiment of the present invention is enlarged and shown.
Figure 7:
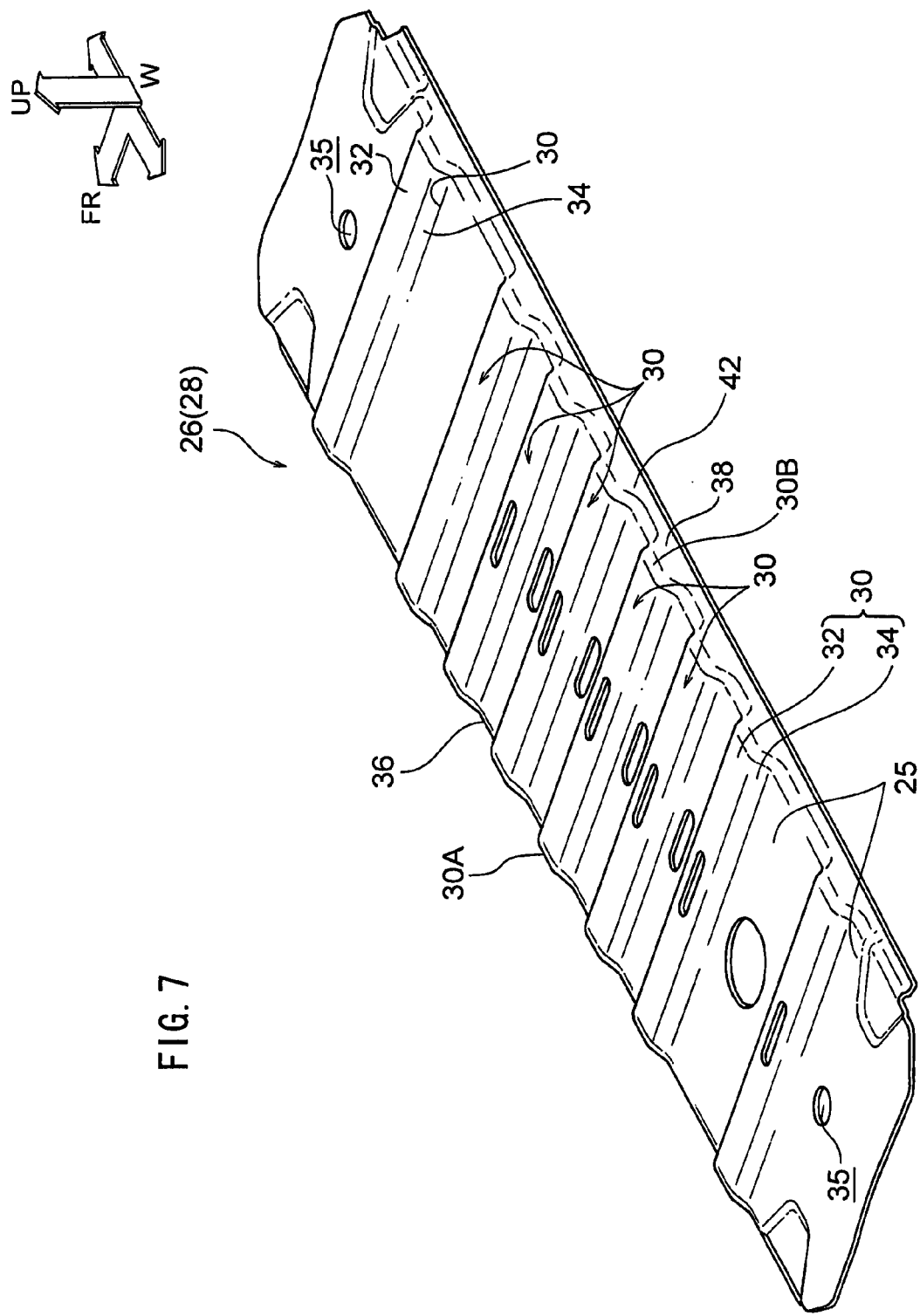
FIG. 7 is a perspective view showing the top plate constituting the vehicle deck structure according to the embodiment of the present invention.

As shown in FIG. 2 and FIG. 7, the top plate 26 has a substantially rectangular shape in plan view, whose longitudinal direction corresponds to the vehicle width direction. As shown in FIG. 1, the length of the top plate 26 along the vehicle width direction substantially corresponds to the width of the deck floor 12 along the vehicle width direction. At the top plate 26, a plurality of ridges 30, each of which has a longitudinal direction corresponding to the vehicle body front-rear direction, are arranged in parallel in the vehicle width direction. The plurality of ridges 30 each comprise a top wall 32 and a pair of right and left side walls 34 and are formed as a bulge portion that is bulged at a vehicle body up-down direction upper side with respect to a base plate portion 25 whose upper surface serves as a general surface of the top plate 26.

Figure 3A:
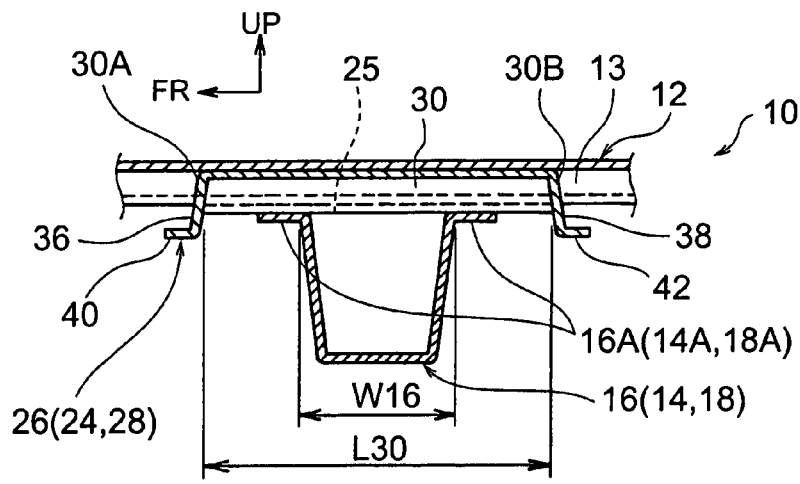

As shown in FIG. 3A, a length $L_{30}$ of a width along the vehicle body front-rear direction of each of the plurality of ridges 30 is made to be larger than a width $W_{16}$ along the vehicle body front-rear direction of the cross member 16. In the present exemplary embodiment, both ends 30A and 30B in the vehicle body front-rear direction in the plurality of ridges 30 are positioned to overhang (project) further to the front and rear than the upper flanges 16A of the cross member 16, respectively.

Figure 3B:
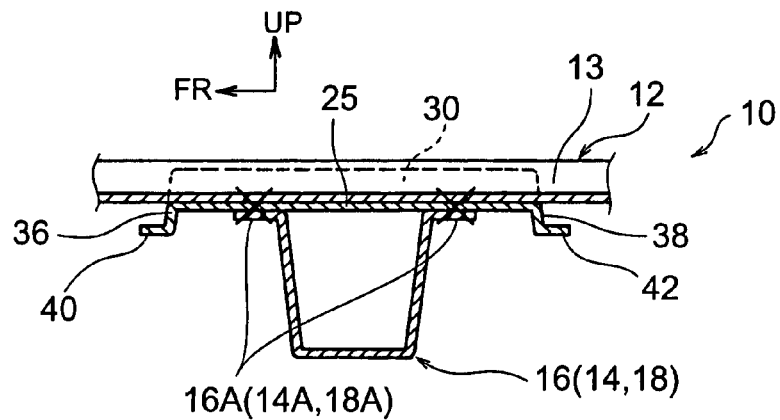
Figure 3C:
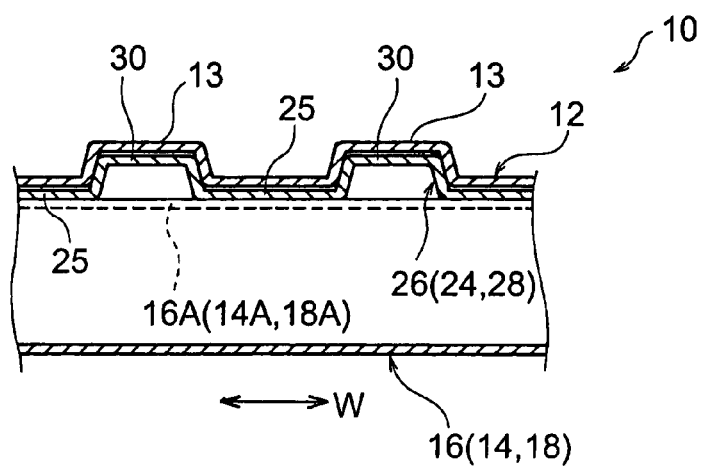

As shown in FIG. 3C, the plurality of ridges 30 described above are configured so as to enter into (be fitted) at the back surface side of the ridges 13 of the deck floor 12. That is to say, the respective ridges 13 of the deck floor 12 are each formed as concave portions that open facing downward in the vehicle body up-down direction, and the ridges 30 formed as bulge portions as described above are configured so as to fit therein from below. In the present exemplary embodiment, eight ridges 30 are formed at the top plate 26 so as to fit into the total of eight ridges 13 excluding the ridges 13 at both vehicle width direction ends in the deck floor 12. It should be noted that penetration holes 35 respectively provided at vehicle width direction outer sides with respect to the ridges 30 at both vehicle width direction ends in the base plate portion 25 are for penetration of a bolt constituting the deck mount M1.

Further, as shown in FIG. 3A and FIG. 3B, upright walls 36 and 38 respectively are formed (are provided upright) from the front and rear ends in the vehicle body front-rear direction of the top plate 26. As shown in FIG. 2 and FIG. 7 (illustration with respect to upright wall 38), the upright walls 36 and 38 are each configured as intermittent walls closing off front and rear ends of the plurality of ridges 30 further toward the upper side in the vehicle body up-down direction from the base plate portion 25 of the top plate 26, and formed as continuous walls having a longitudinal direction corresponding to the vehicle width direction further toward the lower side in the vehicle body up-down direction from the base plate portion 25.

That is to say, the upright walls 36 and 38 are configured as a structure that closes off both ends 30A and 30B in the vehicle body front-rear direction of the ridges 30. Furthermore, as shown in FIG. 3A and FIG. 3B, in the present exemplary embodiment, a lower flange 40 is provided to extend toward the front in the vehicle body front-rear direction from a lower end of the upright wall 36 at the front side, and a lower flange 42 is provided to extend toward the rear in the vehicle body front-rear direction from a lower end of the upright wall 38 at the rear side.

In a state in which the respective ridges 30 of the above-described top plate 26 are entered into the corresponding ridges 13 of the deck floor 12 as discussed above, as shown in FIG. 3B, the base plate portion 25 is overlapped (sandwiched) between the deck floor 12 (a portion other than a region where the plurality of ridges 13 are formed) and the upper flange 16A of the cross member 16, and by joining this overlapped portion by spot welding or the like (refer to the "x" marks in the drawings), the top plate 26 is fixed at each of the deck floor 12 and the cross member 16.

Further, the respective portions of the top plate 26 are integrally formed by press working of a metal plate material. Moreover, lightening portions are appropriately formed at the top plate 26. The lightening portions are mainly formed at the base plate portion 25 and the top wall 32 and are not formed at the pair of right and left side walls 34 or the front and back upright walls 36 and 38.

The top plate 28 is configured in the same manner as the top plate 26, except for being interposed between the cross member 18, in place of the cross member 16, and the deck floor 12, in accordance with the attachment of reference numerals in parentheses in FIG. 2, FIGS. 3A to 3C, and FIG. 7.

As shown in FIG. 1, the number of ridges 30 in the top plate 24 is set to be fewer with respect to the top plates 26 and 28. Specifically, ridges 30 corresponding to the third ridges 30 from both vehicle width direction ends in the top plate 26 are not formed in the top plate 24. Further, in the top plate 24, the dimensions and shapes of the lightening portions are different from those of the top plates 26 and 28. Other configuration of the top plate 24 is the same as the corresponding configuration of the top plates 26 and 28.

In the present exemplary embodiment, a configuration is provided in which no top plate is interposed between the cross member 20, which is supported by the pair of right and left deck mounts M3, and the deck floor 12. In the vehicle deck structure 10, a reinforcing member 44 for reinforcing the region supported by the deck mounts M3 in the cross member 20 is provided.

Next, operation of the present exemplary embodiment will be explained.

In the above-described vehicle deck structure 10, when a loaded material such as luggage or the like is mounted on the deck floor 12 of the deck D, a load acts, which tends to bend the deck floor 12. Further, in the vehicle deck structure 10, input from the chassis frame F is input to the deck floor 12 from the cross members 14, 16, 18 and 20 supported by the deck mounts M (M0 to M3) accompanying traveling of the motor vehicle T.

In the vehicle deck structure 10, since the plurality of ridges 30 which overhang in the vehicle body front-rear direction with respect to the cross members 14, 16 and 18 are formed at the top plates 24, 26 and 28 which are respectively interposed between the deck floor 12 and the cross members 14, 16 and 18, bending in the front-rear direction (bending as seen in side view) of the deck floor 12 is suppressed by these ridges 30.

Specifically, as shown in FIG. 4A, since the pair of right and left side walls 34 constituting the respective ridges 30 extend in the vehicle body up-down direction, rigidity of the ridges 30 with respect to bending in the front-rear direction is high, and bending deformation in the front-rear direction (bending deformation in the direction of arrow X in FIG. 4A of the deck floor 12 overlapped with the ridges 30 is effec-tively suppressed. It should be noted that in FIG. 4, the bending of the ridges 30 is exaggeratedly illustrated.

Figure 5:
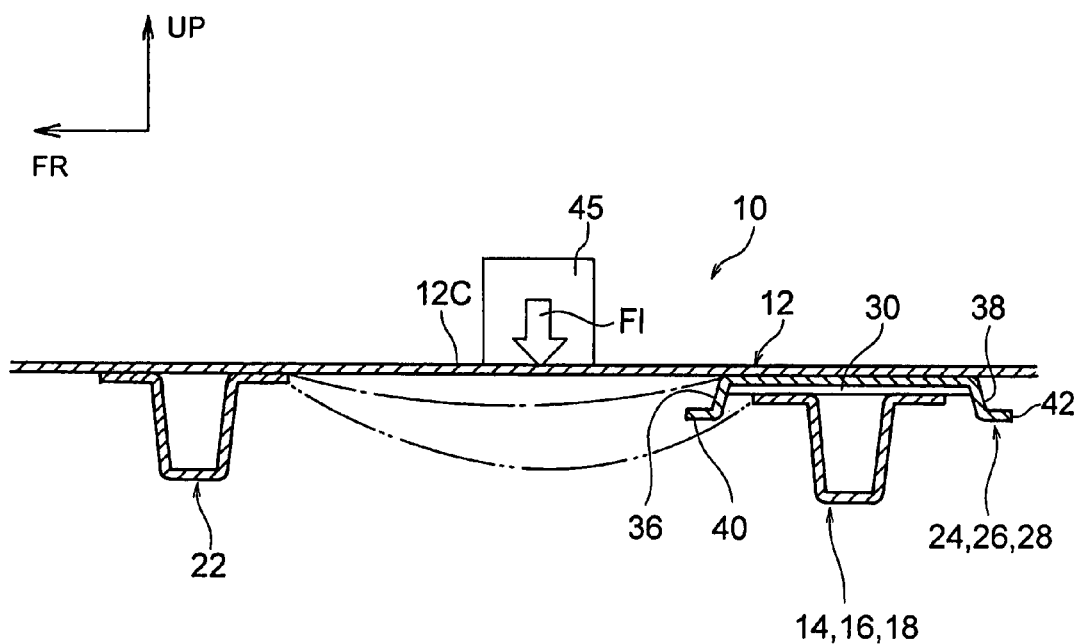
FIG. 5 is a side view of the vehicle deck structure according to the embodiment of the present invention, showing a bending state of a deck floor due to a concentrated load of a loaded material.

In this vehicle deck structure 10, since the bending deformation in the front-rear (arrow X) direction of the deck floor 12 is suppressed by the ridges 30, for example, as shown in FIG. 5, in the case where a load F1 due to a loaded material 45 locally acts at a portion 12C positioned between the cross member 18 and the cross member 22 in the deck floor 12, the bending of the portion 12C (refer to the curved deformation line indicated by the single-dotted dashed line) is effectively suppressed with respect to bending in a case where the top plate 28 is not provided (refer to the curved deformation line indicated by the double-dotted dashed line).

Figure 6A:
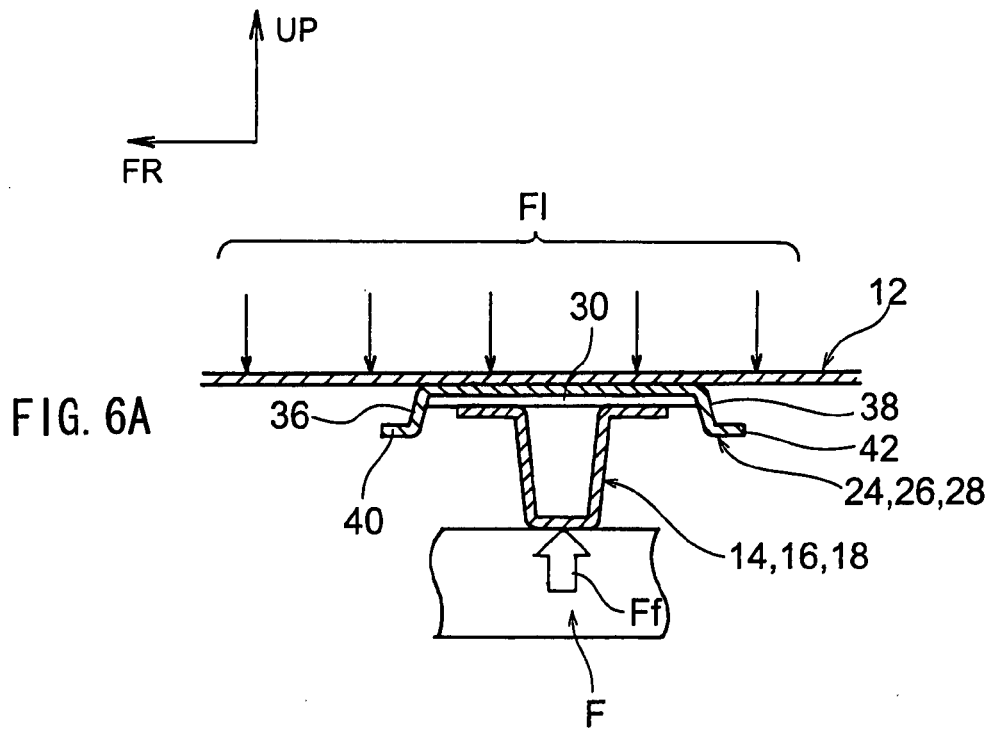
Figure 6B:
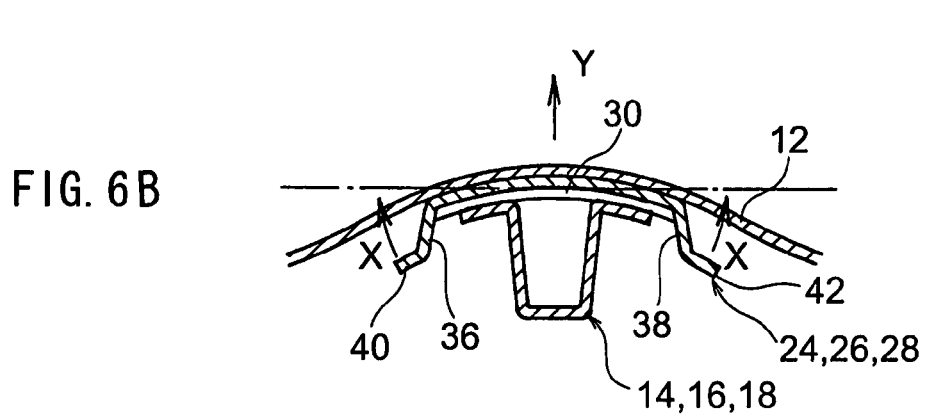

Further, for example, as shown in FIG. 6A, in a case where the load F1 from the loaded material 45 acts dispersed at respective portions including at least a portion of the cross members 14, 16 and 18 and a load Ff from the chassis frame F (road surface) acts concentrated at the region supported by the cross members 14, 16 and 18, as shown in FIG. 6B, bending in the front-rear direction of the deck floor 12 (bending in the arrow Y direction so as to bulge upward) is effectively suppressed, with respect to bending in a case where the top plate 28 is not provided, by the ridges 30.

As a result, in the vehicle deck structure 10, stress acting at the joining portions (spot welding points shown in FIG. 3A of the cross member 18 (top plate 28) and the deck floor 12 is relaxed, and durability hardness is improved. Although omitted in the drawings, similar effects are obtained by a similar operation for the portion of the deck floor 12 supported by the cross members 14 and 16 provided with the top plates 24 and 26.

In particular, in the vehicle deck structure 10, since the ridges 30 of the top plates 24, 26 and 28 overhang at both front and rear sides in the vehicle body front-rear direction with respect to the cross members 14, 16 and 18, respectively, bending deformation of the deck floor 12 in the regions supported by the cross members 14, 16 and 18 is even more effectively suppressed.

Further, in the vehicle deck structure 10, since the upright walls 36 and 38 that are provided from portions overhanging in the vehicle body front-rear direction with respect to the cross members 14, 16 and 18 and that extend in the vehicle width direction are formed at the top plates 24, 26 and 28 respectively interposed between the deck floor 12 and the cross members 14, 16 and 18, bending in the vehicle width direction (bending as seen in front view) of the deck floor 12 is suppressed by these upright walls 36 and 38.

Specifically, as shown in FIG. 4B, since the upright wall 36 and upright wall 38 constituting the respective ridges 30 each have a longitudinal direction corresponding to the vehicle width direction and extend in the vehicle body up-down direction, rigidity of the top plates 24, 26 and 28 with respect to bending in the vehicle width direction is high, and bending deformation in the vehicle width direction (bending deformation in the arrow Z direction in FIG. 4B of the deck floor 12 overlapping with the ridges 30 is effectively suppressed. It should be noted that in FIG. 4, bending of the top plates 24, 26 and 28 is exaggeratedly illustrated.

As a result, in the vehicle deck structure 10, for example, in a case where the load F1 due to the loaded matter acts locally at the portion positioned between the cross members arranged in parallel to the front and rear in the deck floor 12, since bending in the vehicle width direction of this portion is effectively suppressed, for example, a clearance between the deck floor 12 and other parts disposed at the lower side of the deck floor 12 is ensured. In other words, to the degree that deformation (bending) of the deck floor 12 is suppressed, other parts can be disposed toward the upper side, and space utilization efficiency is improved. Further, bending of the deck floor and, in particular, bending in the direction in which the ridges 13 spread, is suppressed, and therefore, appearance is improved.

In particular, in the vehicle deck structure 10, since the pair of front and rear upright walls 36 and 38 are provided at the top plates 24, 26 and 28, bending deformation in the vehicle width direction of the deck floor 12 between the cross members 14, 16 and 18 and the cross members 22 at the front and rear is even more effectively suppressed.

In this manner, in the vehicle deck structure 10 according to the exemplary embodiment, by providing the top plates 24, 26 and 28 comprising the ridges 30 and the upright walls 36 and 38, improvement of the deformation strength (rigidity) in the vehicle body front-rear direction and the vehicle width direction of the deck floor 12 is achieved, and improvement of durability strength is achieved.

Furthermore, in the vehicle deck structure 10, since the plurality of ridges 30 (side walls 34) and the pair of front and rear upright walls 36 and 38 are each provided at the respective top plates 24, 26 and 28, reduction in the number of parts and weight reduction can be achieved compared with a case where an equivalent reinforcing effect is achieved by the addition of cross members. To supplement this point, for example, in order to achieve equivalent performance to the vehicle deck structure 10 with respect to the deformation strength, one cross member would be added at each of the front and rear (i.e., two cross members in total) of the cross member 16 in place of the one top plate 26. In the vehicle deck structure 10 provided with the top plate 26, since the above-mentioned reinforcing effect can be obtained without relying on additional cross members, reduction in the number of parts and weight reduction can be achieved compared with a configuration in which cross members are added.

MODIFIED EXAMPLES OF THE TOP PLATE

Next, modified examples of the top plates 24, 26 and 28 constituting the vehicle deck structure 10 will be explained. It should be noted that, for parts and portions that are fundamentally identical to the above exemplary embodiment or configuration described above, the same reference numbers as in the above exemplary embodiment or the configuration described above are attached, explanation is omitted, and illustration is omitted, in some cases.

First Modified Example

Figure 9A:
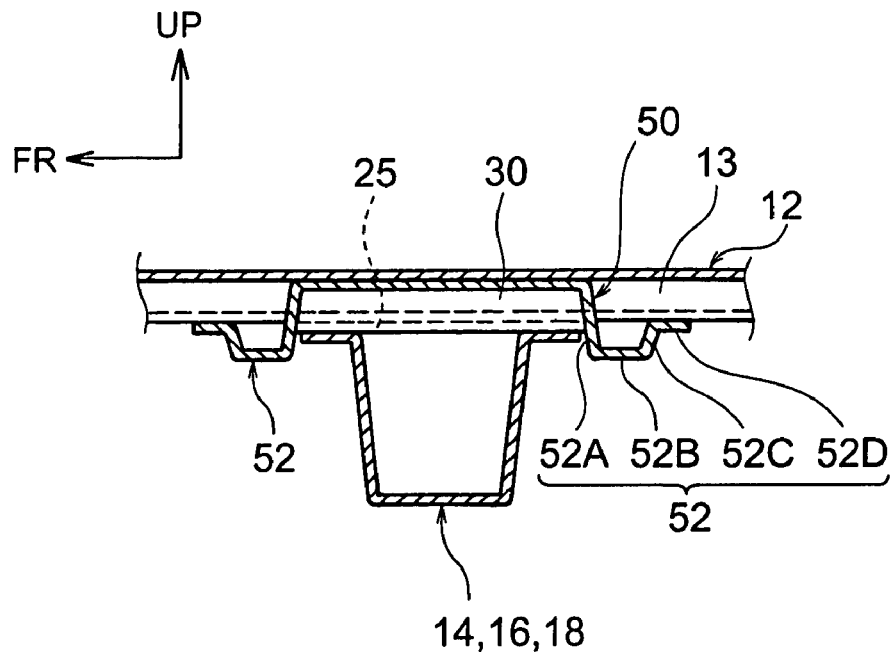
Figure 9B:
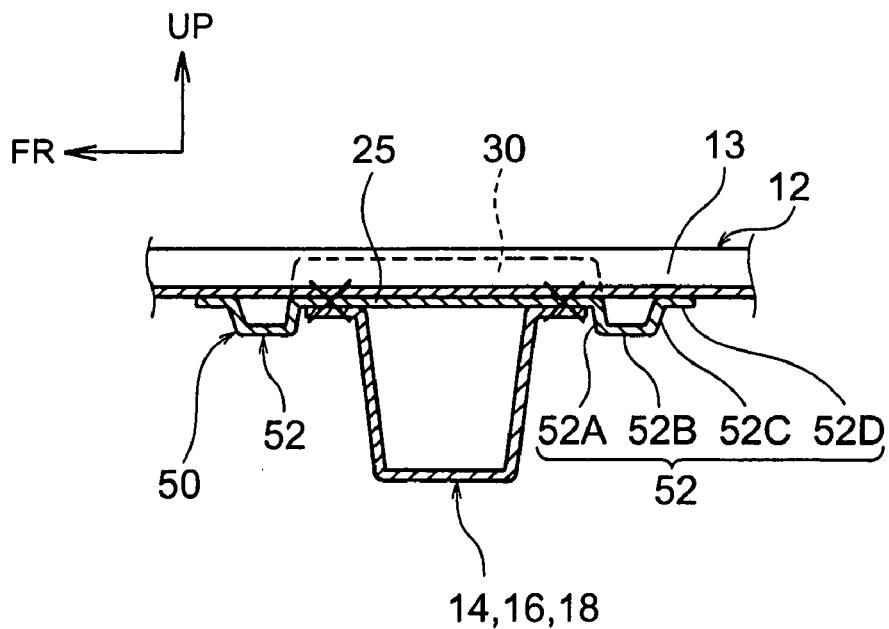

In FIG. 9A and FIG. 9B, a top plate 50 serving as a reinforcing member according to a first modified example is shown in sectional side view. As shown in these drawings, the top plate 50 is different from the top plates 24, 26 and 28 in that a pair of front and rear vehicle width direction beads 52 are provided in place of the upright walls 36 and 38.

Each of the vehicle width direction beads 52 is configured comprising an upright wall portion 52A having substantially the same configuration as the upright wall 36 and the upright wall 38, a bottom wall 52B provided extending in the vehicle body front-rear direction from the upright wall portion 52A, an outer wall 52C provided standing up from a front or rear end of the bottom wall 52B, and a flange 52D provided extending in the front-rear direction from an upper end of the outer wall 52C. Other configuration of the top plate 50 is the same as the corresponding configuration of the top plates 24, 26 and 28. In this modified example, in a broad sense, the pair of front and rear vehicle width direction beads 52 respectively correspond to the upright walls of the present invention, and in a narrow sense, the upright wall portions 52A constituting the vehicle width direction beads 52 correspond to the upright walls of the present invention.

Second Modified Example

In FIG. 10, a top plate 55 serving as a reinforcing member according to a second modified example is shown in sectional side view. As shown in this drawing, the top plate 55 is different from the top plates 24, 26 and 28 in that the lower flanges 40 and 42 extending in the front-rear direction from the front and rear upright walls 36 and 38 are not provided. Other configuration of the top plate 55 is the same as the corresponding configuration of the top plates 24, 26 and 28.

Third Modified Example

Figure 11:
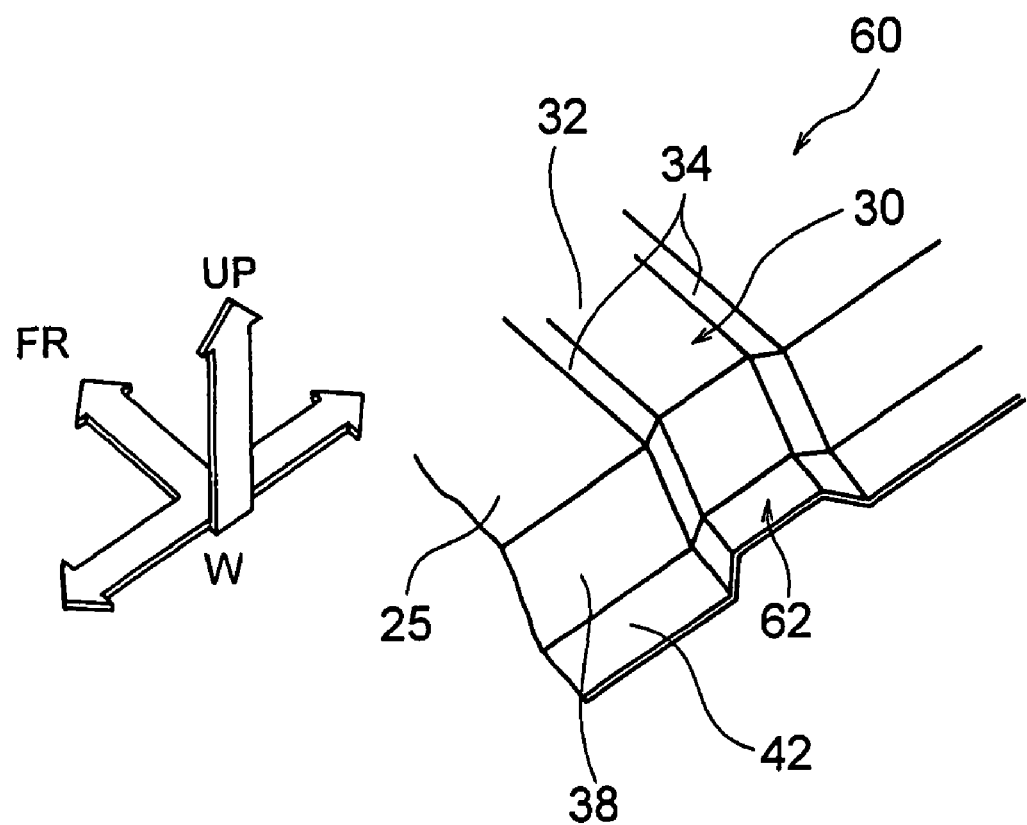
FIG. 11 is a perspective view partially showing a third modified example of the top plate constituting the vehicle deck structure according to the embodiment of the present invention.

In FIG. 11, a portion of a top plate 60 serving as a reinforcing member according to a third modified example is shown in perspective view. As shown in this drawing, the top plate 60 is different from the top plates 24, 26 and 28 in that a bead 62 which is a bulge portion that is continuous with the ridge 30 is formed at the upright wall 38 and the lower flange 42. Other configuration of the top plate 60 is the same as the corresponding configuration of the top plates 24, 26 and 28. It should be noted that the bead 62 can also be provided in the upright wall 36 and the lower flange 40.

Fourth Modified Example

Figure 12:
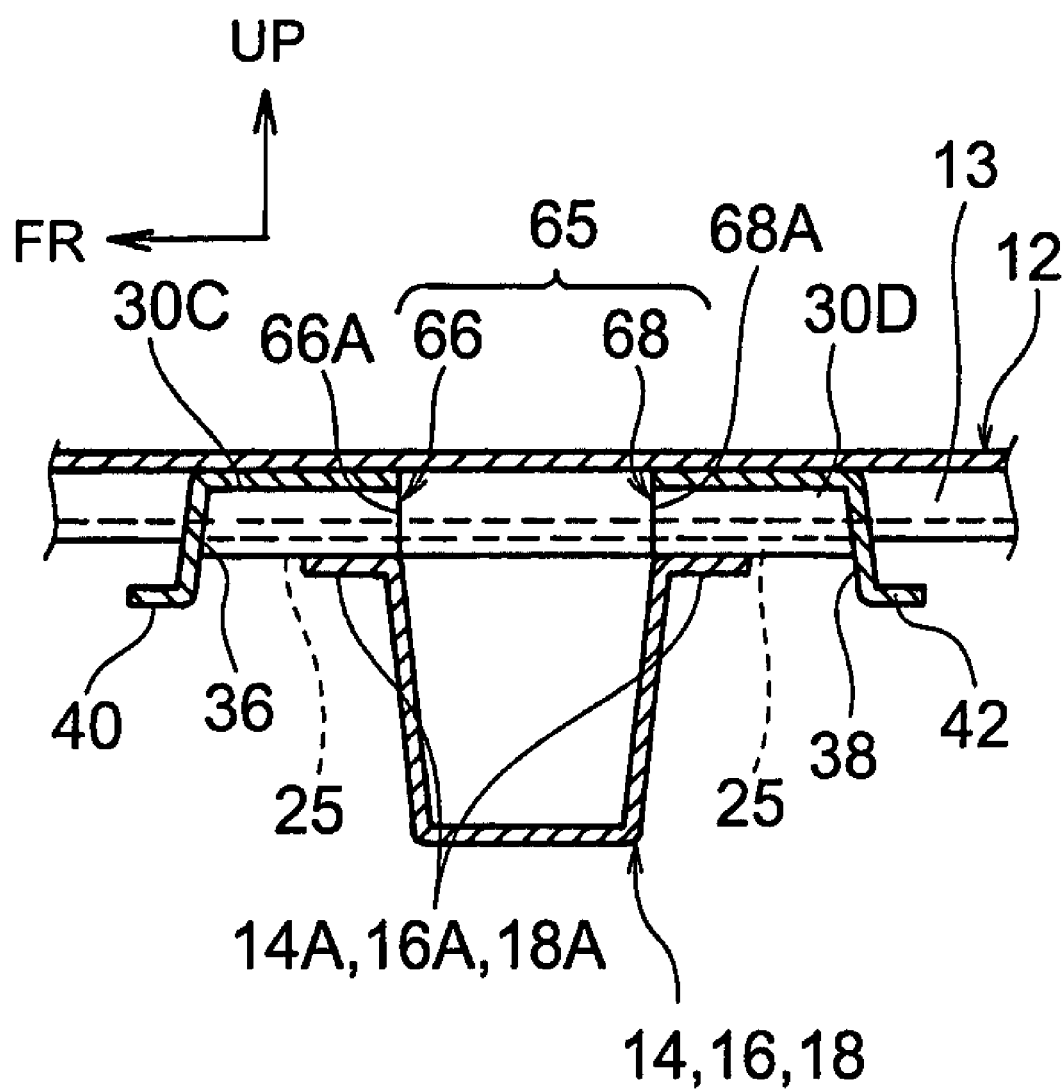
FIG. 12 is a sectional side view showing a fourth modified example of the top plate constituting the vehicle deck structure according to the embodiment of the present invention.

In FIG. 12, a top plate 65 serving as a reinforcing member according to a fourth modified example is shown in sectional side view. As shown in this drawing, the top plate 65 is different from the top plates 24, 26 and 28 in that it is constituted by a pair of front and rear top plates 66 and 68.

In the top plate 66 at the front side, a rear end portion 66A (base plate portion 25) is joined between the upper flange at the front side (upper flange 14A, upper flange 16A or upper flange 18A) in the joined cross member, and the deck floor 12. In this top plate 66, a front portion 30C of the ridge 30, the upright wall 36 and the lower flange 40 are provided. Meanwhile, in the top plate 68, a front end portion 68A (base plate portion 25) is joined between the upper flange at the rear side in the joined cross member, and the deck floor 12. In this top plate 68, a rear portion 30D of the ridge 30, the upright wall 38 and the lower flange 42 are provided. In other words, it is possible to understand the top plate 65 as a top plate that is divided into the top plates 66 and 68 by cutting away a center portion in the vehicle body front-rear direction from the top plates 24, 26 and 28 (i.e., a top plate in which the ridge 30 is open at a portion thereof in the front-rear direction). Other configuration of the top plate 65 is the same as the corresponding configuration of the top plates 24, 26 and 28.

Fifth Modified Example

Figure 13A:
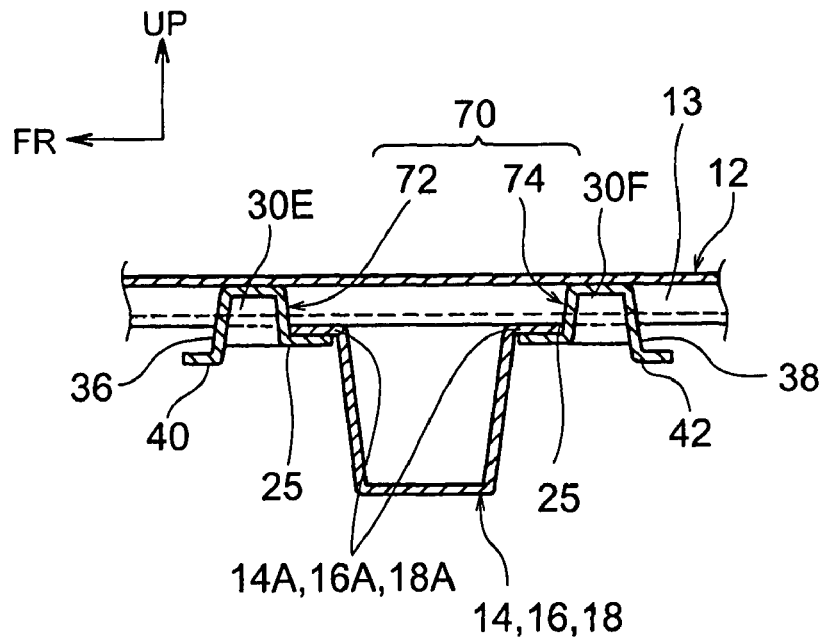
Figure 13B:
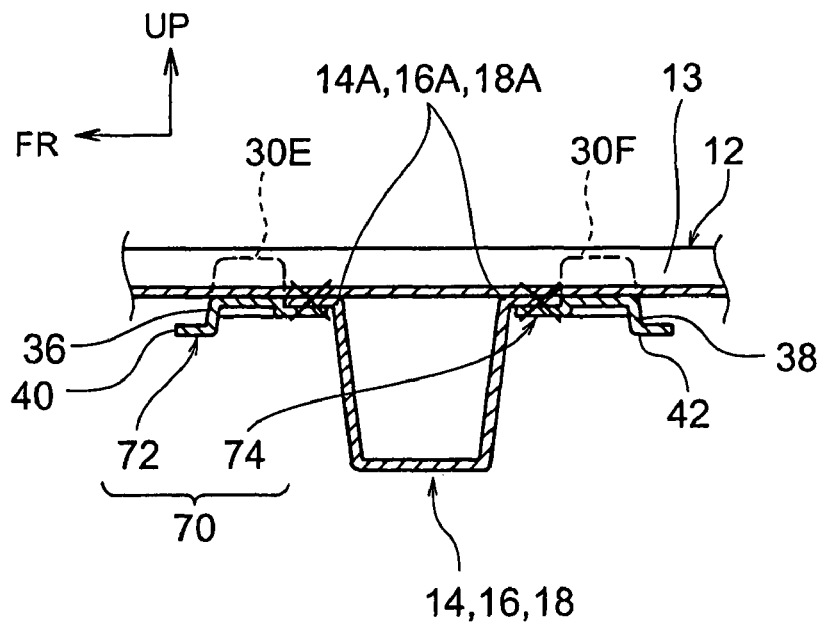

In FIG. 13A and FIG. 13B, a top plate 70 serving as a reinforcing member according to a fifth modified example is shown in sectional side view. As shown in these drawings, the top plate 70 is different from the top plates 24, 26 and 28 in that it is constituted by a pair of front and rear top plates 72 and 74, and in that these top plates 72 and 74 are joined at the lower surface side of the upper flange (upper flange 14A, upper flange 16A or upper flange 18A) of the joined cross member.

That is to say, in the top plate 72, a front end portion 30E of the ridge 30, which overhangs further frontward than the joined cross member (upper flange), is bulged from the base plate portion 25 so that front and rear ends thereof are closed off, and in the top plate 74, a rear end portion 30F of the ridge 30, which overhangs further toward the rear than the joined cross member (upper flange), is bulged from the base plate portion 25 so that front and rear ends thereof are closed off. Further, as shown in FIG. 13B, in a state in which the upper flanges of the cross member, which is joined between the deck floor 12 and the base plate portions 25 of the top plates 72 and 74, are respectively sandwiched therebetween, the base plate portions 25 of the top plates 72 and 74 are joined by spot welding to the deck floor 12 and the upper flanges of the cross member to configure the top plate 70. Other configuration of the top plate 70 is the same as the corresponding configuration of the top plates 24, 26 and 28.

According to the vehicle deck structure 10 in which the top plate 50, 55, 60, 65 or 70 according to the respective modified examples explained above is provided in place of at least any one of the top plates 24, 26 or 28, the same effects can be obtained by an equivalent operation, as in the above-described exemplary embodiment.

It should be noted that the present invention is not limited to the exemplary embodiment or respective modified examples described above, and that it goes without saying that the present invention can be implemented while carrying out various modifications in a range that does not depart from the gist of the invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

A vehicle deck structure according to a first aspect of the present invention comprises a deck floor extending in a vehicle body front-rear direction and a vehicle width direction; a cross member, whose longitudinal direction corresponds to the vehicle width direction, and which is disposed at a lower side in a vehicle body up-down direction with respect to the deck floor; and a reinforcing member having a plurality of ridges, whose longitudinal directions correspond to the vehicle body front-rear direction, and which are arranged in parallel in a vehicle width direction, the reinforcing member being interposed between the cross member and the deck floor with a posture in which the ridges overhang at least one side in the vehicle body front-rear direction with respect to the cross member.

In the above vehicle deck structure, the deck floor extending in the vehicle body front-rear direction and the vehicle width direction is supported by the cross member via the reinforcing member. Since the reinforcing member comprises the plurality of ridges that overhang in the vehicle body front-rear direction from at least one of a front end or a rear end of the cross member in the vehicle body front-rear direction, bending of the deck floor in the front-rear direction (viewed from a vehicle side direction) can be suppressed.

In this manner, deformation of the deck floor can be suppressed in the above vehicle deck structure.

In the vehicle deck structure according to the first aspect of the present invention, the ridges may overhang at both of front and rear sides in the vehicle body front-rear direction with respect to the cross member.

In the above vehicle deck structure, due to the ridges of the reinforcing member overhanging at both of the front and rear sides with respect to the cross member, bending of the deck floor in the front-rear direction is effectively suppressed.

In the vehicle deck structure according to the first aspect of the present invention, the reinforcing member may comprise an upright wall provided standing up along the vehicle body up-down direction from at least one of a front side or a rear side in the vehicle front-rear direction with respect to the cross member, in which a longitudinal direction of the upright wall corresponds to the vehicle width direction.

In the above vehicle deck structure, since the upright wall, which extends in the vehicle body up-down direction from a portion of the reinforcing member that overhangs further than front and rear ends of the cross member in the front-rear direction with a longitudinal direction of the upright wall corresponding to a vehicle width direction, is provided standing up, bending of the deck floor in the vehicle width direction (viewed from the vehicle body front-rear direction) can be suppressed by the upright wall.

A vehicle deck structure according to a second aspect of the present invention comprises a deck floor extending in a vehicle body front-rear direction and a vehicle width direction; a cross member, whose longitudinal direction corresponds to the vehicle width direction, and which is disposed at a lower side in a vehicle body up-down direction with respect to the deck floor; and a reinforcing member that is interposed between the deck floor and the cross member and comprises an upright wall provided standing up along the vehicle body up-down direction from a portion that overhangs at least one of a front side or a rear side in the vehicle body front-rear direction with respect to the cross member, a longitudinal direction of the upright wall corresponding to the vehicle width direction.

In the above vehicle deck structure, the deck floor extending in the vehicle body front-rear direction and the vehicle width direction is supported by the cross member via the reinforcing member. In the reinforcing member, since the upright wall, which extends in the vehicle body up-down direction from the portion that overhangs in the vehicle body front-rear direction from at least one of the front end or the rear end of the cross member in the vehicle body front-rear direction with the longitudinal direction of the upright wall corresponding to the vehicle width direction, is provided standing up, bending of the deck floor in the vehicle width direction (viewed from the vehicle body front-rear direction) can be suppressed by the upright wall.

In the above vehicle deck structure, deformation of the deck floor can be suppressed.

In the vehicle deck structure according to the first aspect or the second aspect, the upright wall may be provided at each of the front side and the rear side in the vehicle body front-rear direction with respect to the cross member.

In the above vehicle deck structure, since the upright wall of the reinforcing member is provided at both of the front and rear sides with respect to the cross member, bending of the deck floor in the vehicle width direction is effectively suppressed.

In the vehicle deck structure according to the first aspect or the second aspect, the deck floor may be supported by a vehicle body frame via the cross member.

In the above vehicle deck structure, since the cross member is interposed between the vehicle body frame and the deck floor, a load from the vehicle body is intensively input at a region supported by the cross member in the deck floor. Since the reinforcing member is provided at this portion, a region at which deformation in the deck floor easily occurs is reinforced, and deformation of the deck floor is effectively suppressed.

In the vehicle deck structure according to the first aspect or the second aspect, the upright wall may be formed as a bead, whose longitudinal direction corresponds to the vehicle width direction.

In the above vehicle deck structure, since the upright wall is formed as a bead, bending of the deck floor in the vehicle width direction (viewed from the vehicle body front-rear direction) and the vehicle front-rear direction can be suppressed by the upright wall.

In the vehicle deck structure according to the first aspect or the second aspect, the upright wall may be formed as a bead shape that is continuous from the ridges of the reinforcing member.

In the above vehicle deck structure, since the upright wall is formed as a bead shape and is continuous from the ridges of the reinforcing member, bending of the deck floor in the vehicle width direction (viewed from the vehicle body front-rear direction) and the vehicle front-rear direction can be suppressed by the upright wall.

In the vehicle deck structure according to the first aspect or the second aspect, the ridges of the reinforcing member may be configured with front and rear regions.

As described above, the vehicle deck structure according to the present invention has the excellent effect of being able to suppress deformation of the deck floor.

What is claimed is:

1. A vehicle deck structure comprising:
    a deck floor extending in a vehicle body front-rear direction and a vehicle width direction;
    a cross member, whose longitudinal direction corresponds to the vehicle width direction, and which is disposed at a lower side in a vehicle body up-down direction with respect to the deck floor; and
    a reinforcing member having a plurality of ridges, whose longitudinal directions correspond to the vehicle body front-rear direction, and which are arranged in parallel in a vehicle width direction, the reinforcing member being interposed between the cross member and the deck floor with a posture in which the ridges overhang at least one side in the vehicle body front-rear direction with respect to the cross member, the reinforcing member having an upright wall provided standing up along the vehicle body up-down direction from a portion that overhangs at at least one of a front side or a rear side in the vehicle body front-rear direction with respect to the cross member, a longitudinal direction of the upright wall corresponding to the vehicle width direction.

2. The vehicle deck structure of claim 1, wherein the ridges overhang at both of front and rear sides in the vehicle body front-rear direction with respect to the cross member.

3. A vehicle deck structure comprising:
    a deck floor extending in a vehicle body front-rear direction and a vehicle width direction;
    a cross member, whose longitudinal direction corresponds to the vehicle width direction, and which opens upward in a vehicle body up-down direction and is disposed at a lower side in a vehicle body up-down direction with respect to the deck floor; and
    a reinforcing member that is interposed between the deck floor and the cross member so as to form, together with the cross member, a closed cross-section structure whose longitudinal direction corresponds to the vehicle width direction, and comprises and upright wall provided standing up along the vehicle body up-down direction from a portion that overhangs at at least one of a front side or a rear side in the vehicle body front-rear direction with respect to the cross member, a longitudinal direction of the upright wall corresponding to the vehicle width direction.

4. The vehicle deck structure of claim 1, wherein the upright wall is provided at each of the front side and the rear side in the vehicle body front-rear direction with respect to the cross member.

5. The vehicle deck structure of claim 1, wherein the deck floor is supported by a vehicle body frame via the cross member.

6. A vehicle deck structure comprising:
    a deck floor extending in a vehicle body front-rear direction and a vehicle width direction;
    a cross member, whose longitudinal direction corresponds to the vehicle width direction, and which opens upward in a vehicle body up-down direction and is disposed at a lower side in a vehicle body up-down direction with respect to the deck floor; and
    a reinforcing member having a plurality of ridges, whose longitudinal directions correspond to the vehicle body front-rear direction, and which are arranged in parallel in a vehicle width direction, the reinforcing member being interposed between the deck floor and the cross member so as to form, together with the cross member, a closed cross-section structure whose longitudinal direction corresponds to the vehicle width direction, with a posture in which the ridges bridge in the vehicle front-rear direction an opening that opens upward in the vehicle body up-down direction in the cross member and overhang at at least one side in the vehicle body front-rear direction with respect to the cross member.

7. The vehicle deck structure according to claim 6, wherein the reinforcing member comprises an upright wall provided standing up along the vehicle body up-down direction at at least one side in the vehicle body front-rear direction with respect to the cross member.

* * * * *